(12) United States Patent
Viola et al.

(10) Patent No.: US 11,499,507 B2
(45) Date of Patent: *Nov. 15, 2022

(54) EVAPORATIVE CANISTER FOR AN INTERNAL COMBUSTION ENGINE

(71) Applicant: GM GLOBAL TECHNOLOGY OPERATIONS LLC, Detroit, MI (US)

(72) Inventors: Michael B. Viola, Macomb Township, MI (US); Anne M. Dailly, West Bloomfield, MI (US); Miles K. Maxey, Ann Arbor, MI (US); Timothy E. McCarthy, Grand Blanc, MI (US); Darrell W. Burleigh, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/176,693

(22) Filed: Feb. 16, 2021

(65) Prior Publication Data

US 2022/0260042 A1   Aug. 18, 2022

(51) Int. Cl.
*F02M 25/08* (2006.01)
*B01D 53/04* (2006.01)

(52) U.S. Cl.
CPC ..... *F02M 25/0854* (2013.01); *B01D 53/0407* (2013.01); *F02M 25/089* (2013.01); *B01D 2253/102* (2013.01); *B01D 2253/204* (2013.01); *B01D 2253/308* (2013.01); *B01D 2259/4516* (2013.01)

(58) Field of Classification Search
CPC .. F02M 25/0854; F02M 25/089; F02M 25/08; F02M 35/10281; F02M 2025/0863; F02M 33/02

See application file for complete search history.

(56) References Cited

U.S. PATENT DOCUMENTS

| | | | |
|---|---|---|---|
| 4,403,587 A | 9/1983 | Mizuno et al. | |
| 5,347,971 A | 9/1994 | Kobayashi et al. | |
| 7,553,352 B2 | 6/2009 | Mueller et al. | |
| 7,753,034 B2 | 7/2010 | Hoke et al. | |
| 9,050,885 B1 | 6/2015 | Dudar et al. | |
| 10,138,846 B1 | 11/2018 | Dudar | |
| 10,174,728 B2 | 1/2019 | Yamauchi et al. | |
| 10,378,462 B1 | 8/2019 | Hamad et al. | |

(Continued)

FOREIGN PATENT DOCUMENTS

WO   2010144360 A2   12/2010

OTHER PUBLICATIONS

Chneeman, Bon, Schwedler; Senkovska, Kaskel, Fischer; Flexible metal-organic frameworks;Royal Society of Chemistry 2014, 43, 6062-6096.

*Primary Examiner* — John Kwon
(74) *Attorney, Agent, or Firm* — Quinn IP Law

(57) ABSTRACT

The concepts described herein provide for a system, apparatus and/or method for fuel vapor capture on-vehicle for evaporative emission control. This includes a device for capturing fuel vapor on-vehicle that includes a canister device having a first port that is fluidly coupled to a head space portion of a fuel tank. The canister device defines a chamber that is fluidly coupled in series between the first port and a second port. A first Metal Organic Framework (MOF) material is disposed in the chamber to adsorb fuel vapor constituents.

20 Claims, 4 Drawing Sheets

(56) References Cited

U.S. PATENT DOCUMENTS

| | | |
|---|---|---|
| 10,704,501 B2 | 7/2020 | Byrne et al. |
| 11,230,997 B1 * | 1/2022 | Viola ................. F02M 35/0218 |
| 2002/0059920 A1 | 5/2002 | Yoshioka et al. |
| 2004/0211320 A1 | 10/2004 | Cain |
| 2012/0024158 A1 | 2/2012 | Makino et al. |
| 2014/0076286 A1 | 3/2014 | Karim et al. |
| 2014/0290611 A1 | 10/2014 | Abd Elhamid et al. |
| 2015/0158378 A1 | 6/2015 | Dudar et al. |
| 2017/0023503 A1 | 1/2017 | Rebinsky |
| 2017/0067415 A1 * | 3/2017 | Cai ................... F02M 25/0854 |
| 2018/0363594 A1 | 12/2018 | Byrne et al. |
| 2020/0147586 A1 | 5/2020 | Ruettinger et al. |
| 2021/0317803 A1 | 10/2021 | Cronin et al. |

\* cited by examiner

EVAPORATIVE CANISTER FOR AN INTERNAL COMBUSTION ENGINE

INTRODUCTION

A vehicle employing an internal combustion engine may emit volatile hydrocarbons from sources that may include an engine air intake system, a fuel delivery system, a fuel tank, and an exhaust gas recirculation (EGR) system. These emissions from the fuel tank and fuel delivery system may be captured employing an evaporative emissions control system that includes a canister that is filled with activated carbon.

A canister can employ activated carbon to adsorb fuel vapor that is emitted from the fuel systems to limit evaporative emissions. The adsorbed fuel vapor is periodically removed from the activated carbon by purging the canister with fresh ambient air, desorbing the fuel vapor from the activated carbon and thereby regenerating the carbon for further adsorption of fuel vapor.

Institution of strict regulations for permissible quantities of hydrocarbon emissions have required progressively tighter control of the quantity of hydrocarbon emissions from motor vehicles, even during periods of disuse. During such periods (i.e., when parked), vehicle fuel systems may be subject to warm environments, which result in increased vapor pressure in the fuel tank.

A canister employing activated carbon may not desorb the entire fuel vapor adsorbed on the adsorbent volume, resulting in residual hydrocarbons ("heel"). The term "heel" as used herein refers to residual hydrocarbons generally present on an adsorbent material when the canister is in a purged or "clean" state and may result in a reduction of the adsorption capacity of the adsorbent. Bleed emissions, on the other hand, refer to emissions that escape from the adsorbent material. Bleed can occur, for example, when the equilibrium between adsorption and desorption favors desorption significantly over adsorption. Such emissions can occur when a vehicle has been subjected to diurnal temperature changes over a period of several days, or diurnal breathing losses. Certain regulations make it desirable for these diurnal breathing loss (DBL) emissions from the canister system to be maintained at very low levels.

Stricter regulations on DBL emissions continue to prompt development of improved evaporative emission control systems, particularly for use in vehicles with reduced purge volumes (i.e., hybrid vehicles). Such vehicles may otherwise produce high DBL emissions due to lower purge frequency, which equates to lower total purge volume and higher residual hydrocarbon heel. Accordingly, it is desirable to have an evaporative emission control system capable of effectively capturing evaporative emissions on vehicles having low purge volumes and/or infrequent purge cycles.

There is a need for an improved method, apparatus, and/or system for capturing volatile hydrocarbons that may be emitted by an on-vehicle fuel tank.

SUMMARY

The concepts described herein provide for a system, apparatus and/or method for fuel vapor capture on-vehicle for evaporative emission control.

An aspect of the disclosure includes a device for capturing fuel vapor on-vehicle that includes a canister device having a first port that is fluidly coupled to a head space portion of a fuel tank. The canister device defines a chamber that is fluidly coupled in series between the first port and a second port. A first Metal Organic Framework (MOF) material is disposed in the chamber to adsorb fuel vapor constituents, which may include n-butane, isobutane, n-pentane, and 2-methylbutane.

Another aspect of the disclosure includes the first MOF material being a MOF material having a pore width that ranges between 2 nm and 2.5 nm.

Another aspect of the disclosure includes the first MOF material being a MOF material having a pore width that is less than 5 nm.

Another aspect of the disclosure includes a second material being disposed in the chamber, wherein the second material is configured to adsorb fuel vapor.

Another aspect of the disclosure includes the first MOF material having a pore width that is less than 5 nm, and the second material being a second MOF material having a pore width that is within a range between 10 nm and 40 nm.

Another aspect of the disclosure includes the first MOF material having a pore width that is less than 5 nm, and the second material being an activated carbon material.

Another aspect of the disclosure includes the first MOF material and the second material being intermixed in the chamber.

Another aspect of the disclosure includes the second MOF material being configured to adsorb oxygenated fuel vapor constituents including ethanol.

Another aspect of the disclosure includes a third material disposed in the chamber, wherein the first MOF material has a pore width that is less than 5 nm, and wherein the second material comprises a second MOF material having a pore width that within a range between 10 nm and 40 nm. The third material is an adsorbent material that is configured to adsorb oxygenated fuel vapor constituents including ethanol. The first MOF material, the second MOF material, and the third material are intermixed in the chamber.

Another aspect of the disclosure includes the first MOF material being a flexible MOF material including a hybrid organic-inorganic material that is assembled by connecting secondary building blocks employing rigid organic ligands, wherein the flexible MOF material is reversibly controllable to one of a first state or a second state in response to a control stimulus. The flexible MOF material is configured to adsorb the fuel vapor in the first state and configured to desorb the fuel vapor in the second state.

Another aspect of the disclosure includes a device for capturing fuel vapor on-vehicle that includes a canister device having a first port that is fluidly coupled to a head space portion of a fuel tank, the canister device defining a plurality of chambers that are fluidly coupled in series between the first port and a second port, wherein the plurality of chambers includes a first chamber that is fluidly coupled in series with a second chamber between the first port and the second port. The first chamber contains a first Metal Organic Framework (MOF) material that is configured to adsorb fuel vapor, and the second chamber contains a second material that is configured to adsorb fuel vapor.

Another aspect of the disclosure includes the second chamber containing a second MOF material that is configured to adsorb fuel vapor.

Another aspect of the disclosure includes the first MOF material being a MOF material having a pore width that is less than 5 nm, and the second MOF material being a MOF material having a pore width that is within a range between 10 nm and 40 nm.

Another aspect of the disclosure includes the canister device defining a third chamber that is fluidly coupled in series with the second chamber between the first chamber and the second port. In one embodiment, the third chamber contains a third MOF material that is configured to adsorb fuel vapor.

Another aspect of the disclosure includes the third chamber containing activated carbon.

Another aspect of the disclosure includes the first MOF material being a flexible MOF material including a hybrid organic-inorganic material that is assembled by connecting secondary building blocks employing rigid organic ligands.

Another aspect of the disclosure includes the flexible MOF material being reversibly controllable to one of a first state or a second state in response to a control stimulus. The flexible MOF material is configured to adsorb the fuel vapor in the first state and configured to desorb the fuel vapor in the second state.

Another aspect of the disclosure includes the control stimulus being one of a partial pressure, a temperature threshold, a light intensity threshold, an electrical signal, or an electro-magnetic signal.

Another aspect of the disclosure includes the flexible MOF material being configured to transform to tightly arranged, small pores that are capable of adsorbing the fuel vapor in the first state, and the flexible MOF material being configured to transform to loosely arranged, large pores capable of desorbing the fuel vapor in the second state.

Another aspect of the disclosure includes the flexible MOF material being one of MIL-53 Al, MIL-88 series, ZIF-8, or Co(bdp).

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
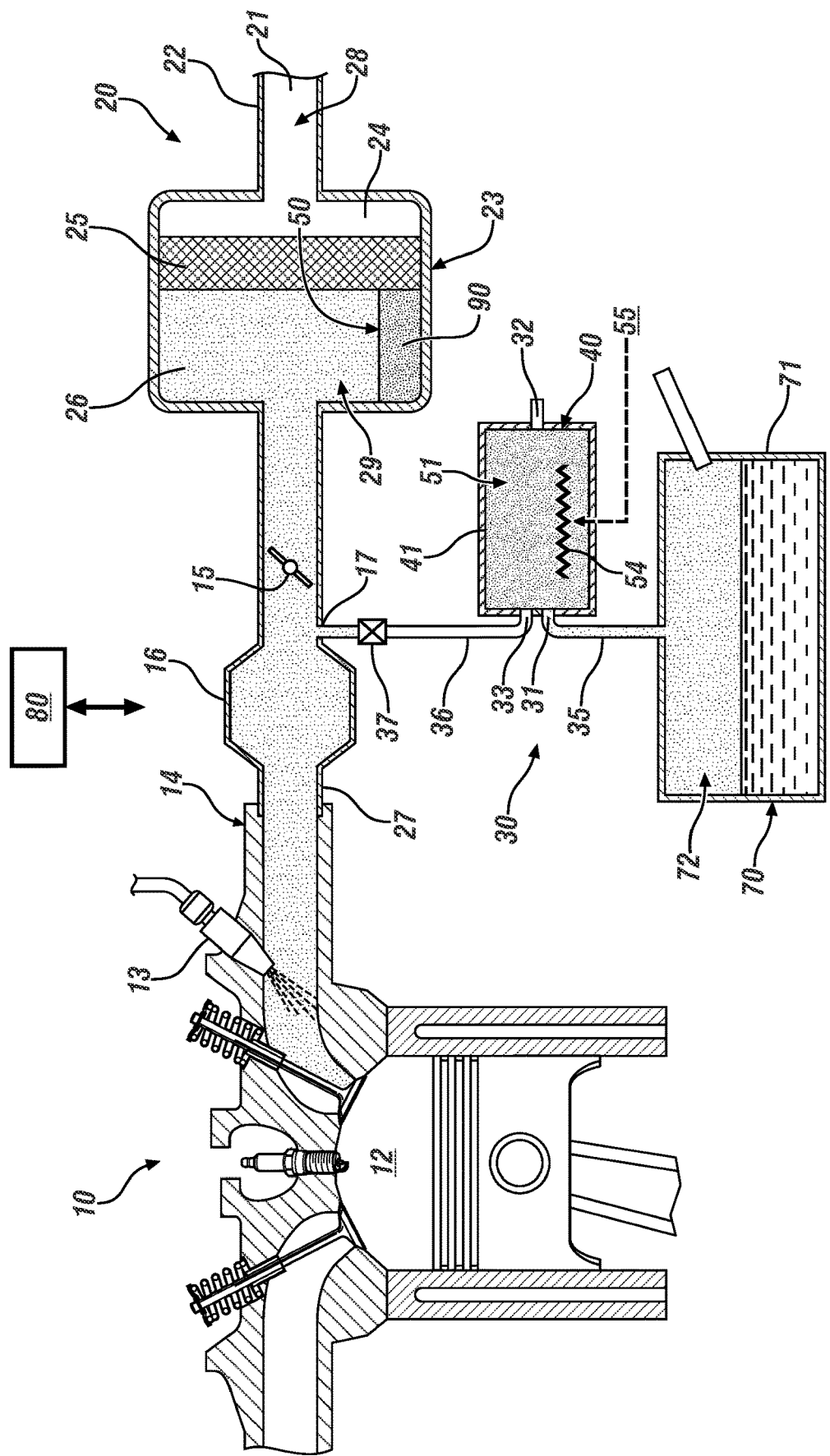
FIG. 1 schematically illustrates portions of an internal combustion engine and evaporative emissions system having an evaporative canister that contains a Metal Organic Framework (MOF) material, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. Furthermore, there is no intention to be bound by an expressed or implied theory presented in the preceding technical field, background, brief summary or the following detailed description. It should be understood that throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

As employed herein, the term "upstream" and related terms refer to elements that are towards an origination of a flow stream relative to an indicated location, and the term "downstream" and related terms refer to elements that are away from an origination of a flow stream relative to an indicated location.

Figure 2:
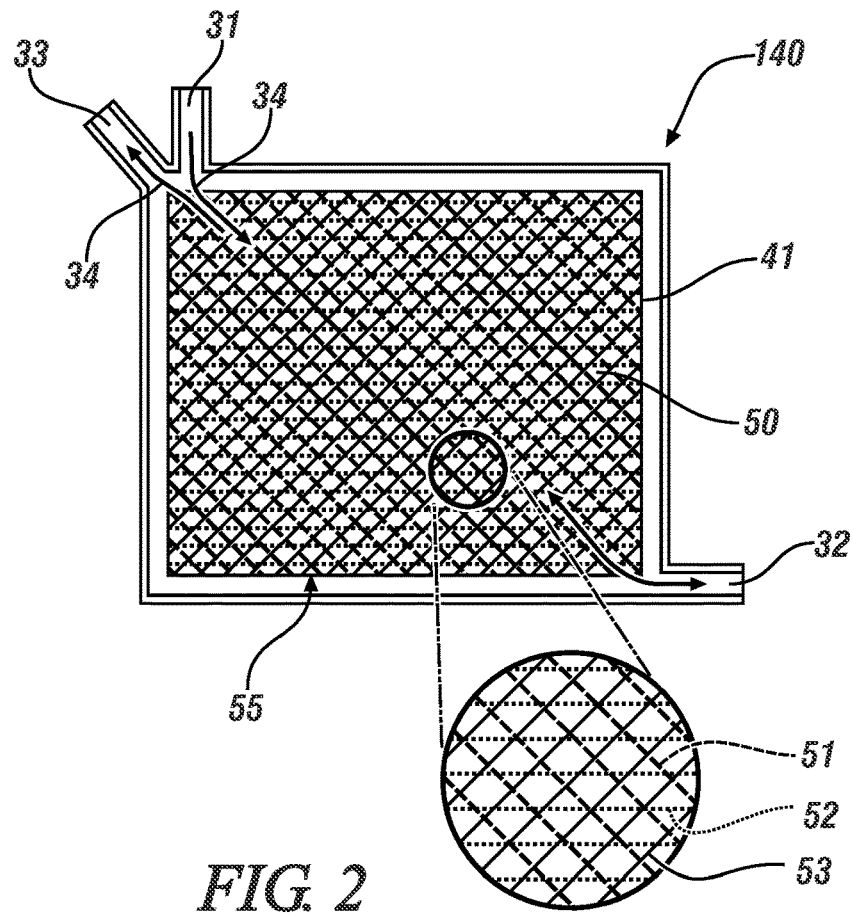
FIG. 2 schematically illustrates an embodiment of an evaporative canister, in accordance with the disclosure.

Referring to the drawings, wherein like reference numerals correspond to like or similar components throughout the several Figures, FIGS. 1 and 2, consistent with embodiments disclosed herein, schematically illustrate a portion of a multi-cylinder internal combustion engine 10, fuel storage system 70, and an evaporative emission system 30 for a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The illustrated portion of the internal combustion engine 10 includes a single combustion chamber 12 that is fluidly coupled to an air intake system 20, and an intake manifold 14. Elements of the internal combustion engine 10 include a fuel injector 13, throttle 15, and air flow sensor 16. The air intake system 20 includes a fresh air inlet 21 fluidly coupled to the intake manifold 14 via a fresh air duct 22, an air filter housing 23, and an intake manifold duct 27. The air filter housing 23 includes an inlet housing 24, an air filter element 25 and a filtered air housing 26. The fresh air inlet 21, fresh air duct 22, and inlet housing 24 of the air filter housing 23 form a fresh air side 28. The filtered air housing 26 of the air filter housing 23, the intake manifold duct 27, and the intake manifold 14 form a filtered air side 29. A vapor capture element 50 may be disposed in the filtered air housing 26 of the air filter housing 23 on the filtered air side 29 between the air filter element 25 and the intake manifold 14.

The internal combustion engine 10 as shown is configured as a spark-ignition internal combustion engine with port fuel injection. The concepts described herein are not limited to such a configuration, and may instead be employed on another form of fuel injection, such as but not limited to a direct-injection system. Furthermore, the concepts described herein may also be applied to a compression-ignition engine.

The fuel storage system 70 includes a fuel storage tank 71 and an evaporative emissions system 30 including an evaporative storage canister 40. The fuel storage system 70 supplies fuel via a fuel pump to an engine fuel distribution system that fluidly couples to engine fuel injectors, including illustrated fuel injector 13. The fuel storage tank 71 is fluidly coupled to a first port 31 of the evaporative storage canister 40 via a vapor line 35. The evaporative storage canister 40 also includes a third port 33 that is fluidly coupled to the air intake system 20 via a purge line 36 and a purge valve 37. The purge line 36 is fluidly coupled to the air intake system 20 on the filtered air side 29 downstream of the throttle 15 at or near the intake manifold 14.

A controller 80 is arranged to control operation of the internal combustion engine 10, including controlling the purge valve 37. In one embodiment, the controller 80 is also in communication with and/or operatively connected to the evaporative storage canister 40, through which the controller 80 communicates control stimulus 55 (shown with reference to FIGS. 1 and 2) or control stimuli 55, 56, 57 (shown with reference to FIG. 3) to an evaporative storage canister, e.g., canister 40.

The evaporative storage canister 40 is arranged as a rigid container that forms and defines a first volumetric chamber 41 that contains a first adsorbent material 51 in one embodiment. The rigid container may be located in a fender well of the vehicle, or underhood, or another location on-vehicle, and is dimensionally configured based upon available space. The rigid container may be configured as a tubular device, a rectangular prismatic device, or another device. The evaporative storage canister 40 may include internal baffles and other structural elements for arranging the first adsorbent material 51 to prevent settling, etc. The evaporative storage canister 40 includes the first port 31, a second port 32, and the third port 33, and associated flow control valves for managing vapor flow under various operating conditions. The second port 32 vents to atmosphere. During an engine-off condition, air and vapor may flow from the head space 72 of the fuel storage tank 71 through the first port 31 and follow flowpath 34 through the first adsorbent material 51 to the second port 32 due to vapor pressure that is generated by heating of the fuel in the fuel storage tank 71. Advantageously, the vapor is adsorbed by the first adsorbent material 51 and air is vented to the atmosphere. During operation of the engine 10, the purge valve 37 may be opened under predefined operating conditions, and air may flow through the second port 32 following flowpath 34 through the canister 40 due to negative pressure that is generated via the engine 10. The air flow desorbs the adsorbed fuel vapor from the first adsorbent material 51, thus serving to purge the canister 40.

In one embodiment, the first adsorbent material 51 is formed from a Metal Organic Framework (MOF) material that is capable of adsorbing and desorbing hydrocarbon material. In one embodiment, the first adsorbent material 51 is formed by arranging the MOF material with a binder material. In one embodiment, the first adsorbent material 51 is formed by depositing the MOF material onto a substrate.

In one embodiment, the first adsorbent material 51 is the MOF material arranged as composite material in the form of beads, spheres, extruded or another shape that is poured into the chamber 41 and sealed therein. The MOF material is configured to adsorb fuel constituents including, e.g., n-butane, isobutane, n-pentane, and 2-methylbutane, and also adsorb oxygenates. In one embodiment, the first adsorbent material 51 is a MOF material having a pore width that ranges between 2 nm and 2.5 nm. In one embodiment, the first adsorbent material is a MOF material having a pore width that is less than 5 nm. Additional details related to MOF materials, pore widths, etc. are described with reference to FIG. 6. In one embodiment, the first adsorbent material 51 includes a MOF material composed of metal coordination polymers having copper (Cu) acting as joints and benzene-1,3,5-tricarboxylate (BTC) ligand as the linkers, e.g., CuBTC.

In one embodiment, the first adsorbent material 51 is fabricated as a flexible Metal Organic Framework (MOF) material that is capable of adsorbing and desorbing hydrocarbon material in response to control stimulus 55. In one embodiment, the flexible MOF material is arranged with a binder material. In one embodiment, the flexible MOF material is deposited onto a substrate. In one embodiment, the flexible MOF material is arranged as a composite material in the form of beads, spheres, extruded or another shape that is poured into the chamber 41 and sealed therein. In one embodiment, the flexible MOF material having a pore width that ranges between 2 nm and 2.5 nm. In one embodiment, the flexible MOF material having a pore width that is less than 5 nm. Additional details related to flexible MOF materials, pore widths, etc. are described with reference to FIGS. 4 and 5.

Flexible MOF materials are a class of MOF material that exhibits a dynamic change of pore dimensions in response to an external stimulus, wherein the change of pore dimensions is reversibly controllable to one of a first state or a second state, which may be provided by control stimulus, e.g., control stimulus 55. Flexible MOF material has the characteristics of framework flexibility and dynamic response, which distinguishes it from other porous materials such as zeolites and activated carbons. In accordance with the construction natures and features, the flexible MOF material can show diverse types and magnitudes of structural dynamism. This many include a state change that includes expansion and contraction of pore diameter, also known as a breathing mechanism. The breathing mechanism may be triggered by external chemical stimuli, e.g., guest adsorption, desorption, and exchange. The breathing mechanism may instead be triggered by external physical stimuli, e.g., a change in temperature, light, and/or pressure. Flexible MOF materials are configured to transform to have tightly arranged, small pores that are capable of adsorbing hydrocarbon vapor when the control stimulus 55 is in the first state. Volatile hydrocarbon vapor may precipitate onto and/or be adsorbed by the flexible MOF material of the first adsorbent material 51 during an engine-off state when controlled by the control stimulus 55 to the first state. The flexible MOF material is configured to transform to have loosely arranged, large pores capable of desorbing hydrocarbon vapor when the control stimulus 55 is in the second state. The hydrocarbon vapor that is adsorbed by the flexible MOF material of the first adsorbent material 51 during an engine-off state may be desorbed by the flexible MOF material during an engine-on state when the flexible MOF material is controlled by the control stimulus 55 to the second state, e.g., during an evaporative purging event.

The breathing mechanism that is exhibited by the flexible MOF material in response to the control stimulus 55 can facilitate desorption of hydrocarbon vapor during a purge event, thus enabling faster purging of the canister that is more complete, as compared to a canister that employs activated carbon. Furthermore, flexible MOFs can store greater amounts of hydrocarbon vapor than similarly sized (by volume) devices that employ activated carbon.

Referring again to FIG. 1, the controller 80 is operatively connected to the canister 40 via the control stimulus 55. The controller 80 generates the control stimulus 55 that is communicated to the canister 40. The control stimulus 55 includes a first state and a second state, and may be a constant signal, a pulsewidth-modulated signal or another modulated signal in the form of electrical voltage, electrical current, electro-magnetic pulse, emitted light, pressure, etc., without limitation. In one embodiment, an actuator 54 is integrated into the canister 40 or is arranged proximal to the canister 40, and is controlled in response to the control stimulus 55 to either the first state or the second state. In one embodiment, the actuator 54 is an electrically resistive substrate, e.g., formed from carbon on which the flexible MOF material of the first adsorbent material 51 is deposited, and can be controlled to either an on state or an off state in response to the control stimulus 55 to control the canister 40. In one embodiment, the actuator 54 is an electrically-powered heating element that is proximal to the flexible MOF material of the first adsorbent material 51, and can be controlled to either an on state or an off state in response to the control stimulus 55 to control the canister 40. Alternatively, the actuator 54 may be an electro-magnetic device, a light emitting device, etc.

The flexible MOF material may be one of or a combination of MIL-53 Al, MIL-88 series, ZIF-8, and/or Co(bdp). MIL-53 Al is an aluminum terephthalate MOF; MIL-88 series is an iron (III) dicarboxylate MOF; ZIF-8 is a zeolitic imidazolate framework that is made by zinc ions that are coordinated by four imidazolate rings; and Co(bdp) is a cobalt-based MOF with $bdp^{2-}$=1,4-benzenedipyrazolate linker.

FIG. 2 schematically illustrates an alternative embodiment of the evaporative storage canister 140 that can be employed on an embodiment of the vehicle and internal combustion engine 10 described with reference to FIG. 1. In this embodiment, the evaporative storage canister 140 is arranged as a rigid container that forms and defines the first volumetric chamber 41. A second adsorbent 50 is contained in the first volumetric chamber 41. The rigid container may be located in a fender well of the vehicle, or underhood, or another location on-vehicle, and is dimensionally configured based upon available space. The rigid container may be configured as a tubular device, a rectangular prismatic device, or another device. The evaporative storage canister 140 may include internal baffles and other structural elements for arranging the second adsorbent material 50 to prevent settling, etc. The evaporative storage canister 140 includes the first port 31, a second port 32, and the third port 33, and associated flow control valves for managing vapor flow under various operating conditions.

In one embodiment, the second adsorbent 50 includes the first adsorbent material 51 that is intermixed with a second adsorbent material 52. In one embodiment, the second adsorbent 50 includes the first adsorbent material 51 intermixed with a third adsorbent material 53. In one embodiment, the second adsorbent 50 includes the first adsorbent material 51 intermixed with the second adsorbent material 52 and the third adsorbent material 53.

The first adsorbent material 51 has been described with reference to FIG. 1, and is a MOF material having a pore width that ranges between 2.5 nm and 5 nm in one embodiment, or having a pore width that is less than 5 nm in one embodiment. Alternatively, the first adsorbent material 51 is a flexible MOF material. In one embodiment, the second adsorbent material 52 is a MOF material having a pore width that ranges between 10 nm and 40 nm. Alternatively, the second adsorbent material 52 is a MOF material that is configured to adsorb oxygenated fuel vapor constituents including ethanol. Alternatively, the second adsorbent material 52 is a flexible MOF material. In one embodiment, the third adsorbent material 53 is an activated charcoal material. Various combinations of the first, second and third adsorbent materials 51, 52, 53 may be selected and employed to accomplish the task of capturing, storing, and releasing fuel vapor constituents.

Figure 3:
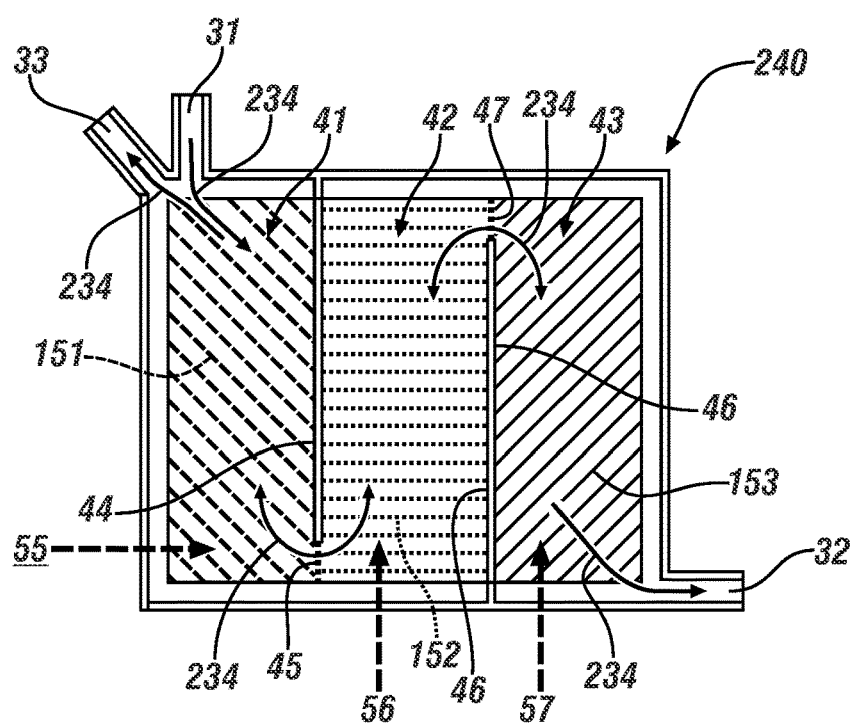
FIG. 3 schematically illustrates another embodiment of an evaporative canister including a plurality of chambers arranged in series, in accordance with the disclosure.

FIG. 3 schematically illustrates an alternative embodiment of the evaporative storage canister 240 that can be employed on an embodiment of the vehicle and internal combustion engine 10 described with reference to FIG. 1. In this embodiment, the evaporative storage canister 240 is arranged as a rigid container having a rectangular prismatic shape that forms and defines a plurality of chambers that are arranged in series between the first port 31 and the second port 32. In one embodiment, and as described herein, the evaporative storage canister 240 includes the first volumetric chamber 41 arranged in series with a second volumetric chamber 42, which is arranged in series with a third volumetric chamber 43, which is fluidly coupled on one end to the second port 32. In one embodiment, and as shown, the first volumetric chamber 41, the second volumetric chamber 42 and the third volumetric chamber 43 are arranged as rectangular prismatic structures that are arranged side-by-side, with the first volumetric chamber 41 being separated from the second volumetric chamber 42 by a first separator 44, and with the second volumetric chamber 42 being separated from the third volumetric chamber 43 by a second separator 46. The first separator 44 has a first screen 45 on a first end, and the second separator 46 has a second screen 47 on a second, opposed end. The arrangement facilitates a flowpath 234 through the evaporative storage canister 240 between the first port 31 and the second port 32 that passes through the first volumetric chamber 41, the second volumetric chamber 42 and the third volumetric chamber 43 in series.

The first volumetric chamber 41 is filled with first adsorbent material 151, the second volumetric chamber 42 is filled with a second adsorbent material 152, and the third volumetric chamber 43 is filled with a third adsorbent material 153.

The first adsorbent material 151 may be analogous to the first adsorbent material 51 that has been described with reference to FIG. 1, which is a MOF material having a pore width that ranges between 2.5 nm and 5 nm in one embodiment, or having a pore width that is less than 5 nm in one embodiment. Alternatively, the first adsorbent material 151 is a flexible MOF material that is controlled by first control stimulus 55. Alternatively, the first adsorbent material 151 is an activated carbon material.

The second adsorbent material 152 may be analogous to the second adsorbent material 52 that has been described with reference to FIG. 2, which is a MOF material having a pore width that ranges between 10 nm and 40 nm in one embodiment. Alternatively, the second adsorbent material 152 is a MOF material that is configured to adsorb oxygenated fuel vapor constituents including ethanol. Alternatively, the second adsorbent material 152 is a flexible MOF material that is controlled by second control stimulus 56. Alternatively, the second adsorbent material 152 is an activated carbon material.

The third adsorbent material 153 is an activated charcoal material in one embodiment. Alternatively, the third adsorbent material 153 is a flexible MOF material that is controlled by third control stimulus 57.

The controller 80 is operatively connected to the canister purge valve 37 and the first, second, and/or third control stimuli 55, 56, 57, when employed. The controller 80 generates the first, second, and/or third control stimuli 55, 56, 57. Each of the first, second, and/or third control stimuli 55, 56, 57, includes a first state and a second state. The control stimuli 55, 56, 57 may be one of or a combination of a partial pressure, an ambient temperature, a light intensity, an electrical signal, an electro-magnetic signal, etc. The control stimuli 55, 56, 57 includes a first state and a second state, and may be a constant signal, a pulsewidth-modulated signal or another modulated signal in the form of electrical voltage, electrical current, electro-magnetic pulse, emitted light, pressure, etc. In one embodiment, the control stimuli 55, 56, 57 are in the form of control signals that may be actively generated by the controller 80. In such embodiments, the control stimuli 55, 56, 57 may be constant or modulated electrical voltage or current signals, or electro-magnetic signals. In one embodiment, the control stimuli 55, 56, 57 are supplied to actuators (not shown) that are integrated into or proximal to the respective first, second, and/or third adsorbent material 151, 152, 153. The actuators are analogous to the actuator 54 that is described with reference to FIG. 1. In one embodiment, the actuators may be heating elements. Alternatively, the actuators may be electro-magnetic devices, light bulbs, etc. In one embodiment, the control stimuli 55, 56, 57 are indirectly generated by one or more engine operating conditions and/or vehicle operating conditions. In such embodiments, the control stimuli 55, 56, 57 may be one or a combination of a partial pressure, or an ambient temperature, or a light intensity.

Figure 4:
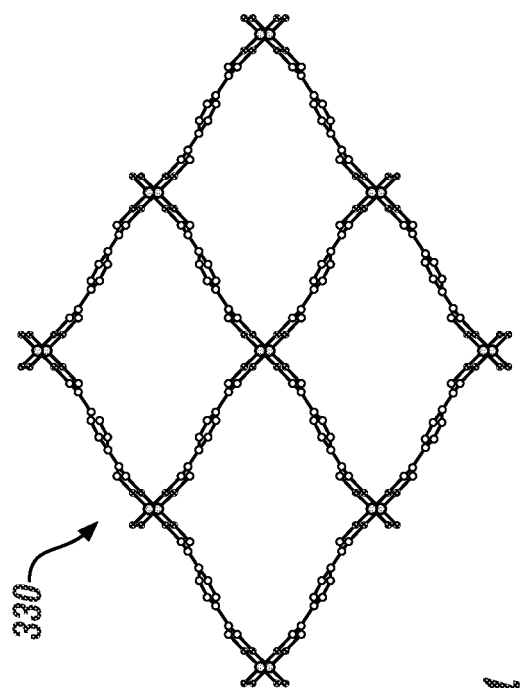
FIG. 4 pictorially shows an example flexible MOF material, in accordance with the disclosure.
Figure 4:
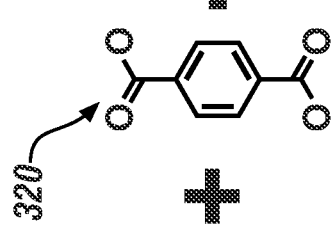
Figure 4:
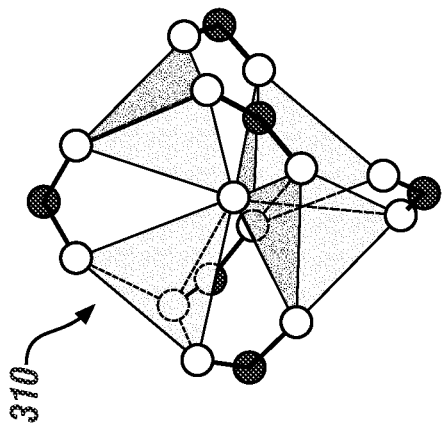

FIG. 4 pictorially shows an example of a flexible MOF 330. The flexible MOF 330 is a hybrid organic-inorganic material that is assembled by connection of Secondary Building Blocks (SBU) 310 through rigid organic ligands 320. In one embodiment, the SBU 310 includes metal oxide clusters. The flexible MOF 330 may also be described as having interchangeable metal-containing nodes and carbon-based struts. Pore sizes and their chemical functionality can be tailored through control of the architecture, including being tailored to adsorb specific hydrocarbon molecules.

Figure 5:
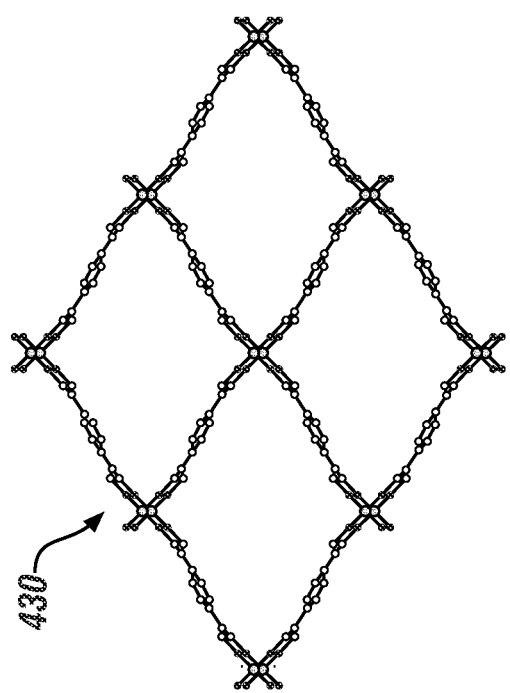
FIG. 5 pictorially illustrates a portion of an example flexible MOF material in a first, collapsed state and in a second, expanded state, and an associated control stimulus, in accordance with the disclosure.
Figure 5:
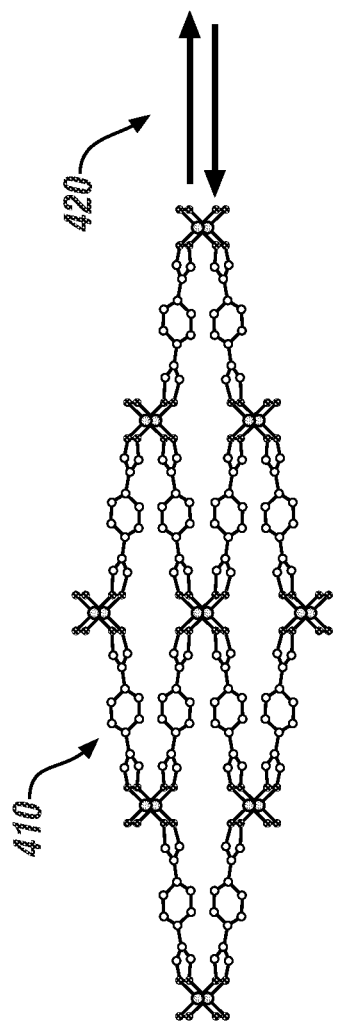

FIG. 5 pictorially illustrates a portion of an embodiment of the flexible MOF material, e.g., Co(bdp), in a first, collapsed state 410 and in a second, expanded state 430, and an associated control stimulus 420. The flexible MOF material is reversibly controllable to the first, collapsed state 410 and to the second, expanded state 430 in response to the control stimulus 420. As illustrated, the flexible MOF material is transformable to have tightly arranged, small pores that are capable of adsorbing hydrocarbon vapor when commanded to the first, collapsed state 410 by the control stimulus 420. As illustrated, the flexible MOF material is transformable to have loosely arranged, large pores that are capable of desorbing hydrocarbon vapor when commanded to the second, expanded state 430 by the control stimulus 420.

Referring again to FIG. 1, the vapor capture element 50 in the air intake system 20 includes a flexible MOF material 90 that is similar to the flexible MOF material of the first adsorbent material 51, and is reversibly controllable in response to a control stimulus.

Through proper design, the HC adsorber can adsorb/desorb hydrocarbon vapor. It would also display less of a heel which is a permanent loss of vapor capture, as compared to activated carbon based HC-adsorbers.

Figure 6:
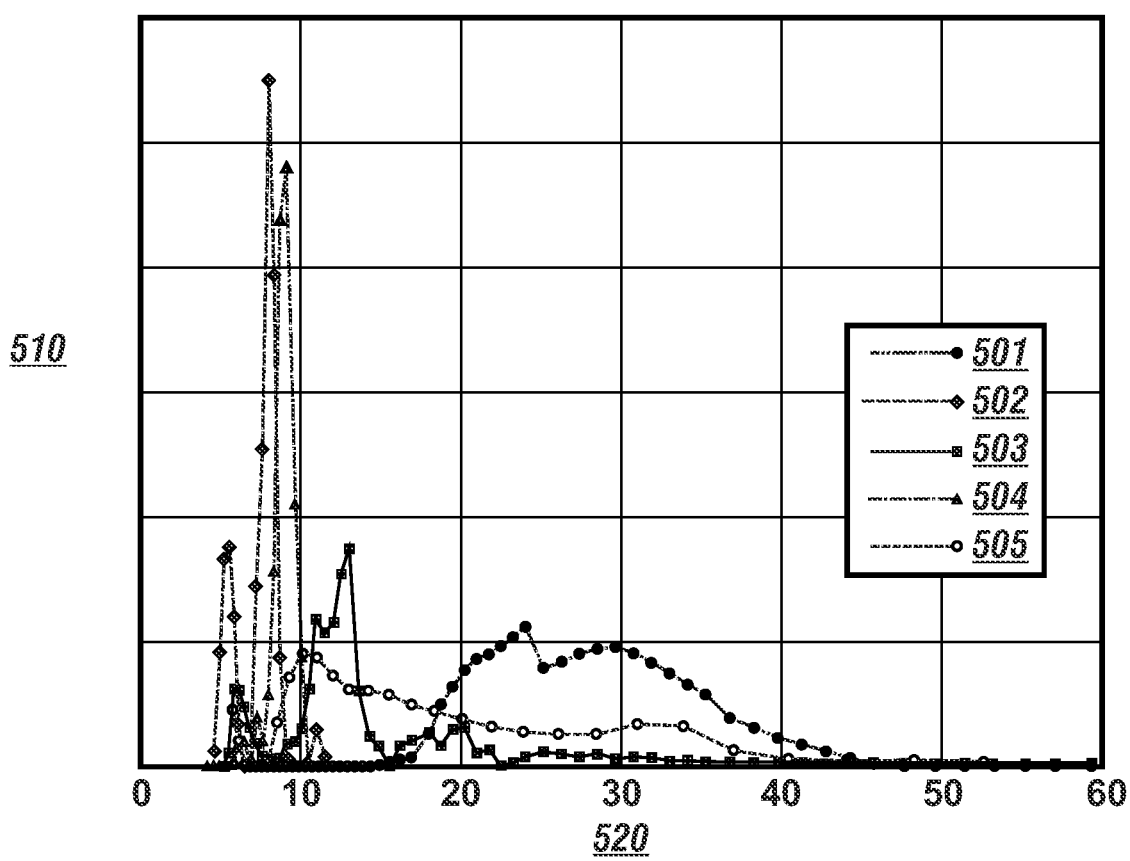
FIG. 6 graphically illustrates pore size distribution for four flexible MOFs and activated carbon, in accordance with the disclosure.

FIG. 6 graphically displays the pore size distribution for four MOFs and activated carbon, with distribution 510 shown on the vertical axis and pore width 520 shown on the horizontal axis. The activated carbon is indicated by numeral 501. The four MOFs include $Cu_3BTC_2$ 502, UiO-67 503, ZIF-8 504, and DUT-6 505. These results indicate that the MOFs have more well-defined types of pores than the activated carbon. For instance, $Cu_3BTC_2$ 502 features a small tetrahedral cage along with one dimensional square channels, 9 and 6 Å. The UiO-67 503 is constructed by small tetrahedral and large octahedral cages. The DUT-6 505 has the largest average pore width of the four illustrated MOFs.

Compositions of gasoline fuel are a combination of alkanes ($C_4$-$C_{12}$) and aromatics (alkylbenzenes, indanes, naphthalenes) in the boiling range of approximately 35-200° C., and one or more oxygenates such as ethanol. In terms of blend compositions, gasoline may contain 55-77% saturated hydrocarbons, 9-36% aromatics, some unsaturated hydrocarbons and 10-15% ethanol. Gasoline vapor contains very volatile organic compounds (VVOCs), with n-butane, isobutane, n-pentane and 2-methylbutane collectively accounting for 60-77 wt %. The most abundant alkane in evaporated gasoline is n-butane. Headspace compositions can be predicted using the fuel's composition, vapor-liquid equilibrium theory and activity coefficients.

When dealing with a gasoline fuel mixture the different physical properties of each constituent, such as the size, shape, polarization, binding energy, and the diffusion kinetics are considered. Effective reversible adsorption and desorption of the gas mixture on an adsorbent might be challenged by the presence of specific constituents. The adsorbent's stability through adsorption-desorption cycles is critical for vehicular applications as it affects the in-use service life of an evaporative emissions system. The flexible MOF material can be advantageously tailored to the molecules to be adsorbed for application in an evaporative emissions system. The use of a flexible MOF as described herein allows tuning of the pore aperture size for adsorption and for desorption to achieve the desired properties for selectively adsorbing and desorbing desired components of a gas mixture, e.g., VVOCs such as n-butane.

The design of an adsorbent requires having a full understanding of the adsorbent structure including pore size/shape, and other adsorbate properties. In this embodiment, the adsorbates are hydrocarbon molecules that adhere to the surface by weak attractive interactions referred to as van der Waals forces. Adsorption occurs in pores whose diameter is close to twice the molecular diameter of the molecule being adsorbed which is why pore size distribution within the adsorbent is a determining factor. These are the type of adsorbate characteristics required to better develop material or combination of materials to adsorb molecules contained in headspace composition. The flexible MOF design that is best adapted to adsorb butane has a 2 nm to 2.5 nm pore size, in one embodiment, based upon a correlation between the adsorption capacity of n-butane and the pore characteristics previously mentioned.

Another material characteristic which may affect the adsorbate adsorption uptake is the presence of open metal sites. In some MOFs, metal centers are bonded in specific coordination environment leaving the cation in the center open and accessible to the adsorbed gas molecules. Unsaturated metal sites have been shown to enhance certain adsorbate affinities compared to non-open metals.

Pores sizes are selected to provide easy diffusion paths for the adsorbate molecules to be desorbed from and diffuse out of the pore network. Pores potentially too small are not desirable as they are likely to trap large molecules, resulting in a decrease in storage capacity over time.

This arrangement of the canister facilitates adapting the constituent elements of the canister, i.e., the materials, depending upon the application and market, thus providing flexibility in a single container by changing the adsorbent material(s).

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A device for capturing fuel vapor on a vehicle, the device comprising:

a canister device having a first port that is fluidly coupled to a head space portion of a fuel tank, the canister device defining a chamber that is fluidly coupled in series between the first port and a second port; and a first Metal Organic Framework (MOF) material disposed in the chamber, wherein the first MOF is configured to adsorb fuel vapor.

2. The device of claim 1, wherein the first MOF material comprises a Metal Organic Framework (MOF) material having a pore width that ranges between 2 nm and 2.5 nm.

3. The device of claim 1, wherein the first MOF material comprises a Metal Organic Framework (MOF) material having a pore width that is less than 5 nm.

4. The device of claim 1, further comprising a second material disposed in the chamber, wherein the second material is configured to adsorb fuel vapor.

5. The device of claim 4, wherein the first MOF material has a pore width that is less than 5 nm, and wherein the second material comprises a second MOF material having a pore width that is within a range between 10 nm and 40 nm.

6. The device of claim 4, wherein the first MOF material has a pore width that is less than 5 nm, and wherein the second material comprises an activated carbon material.

7. The device of claim 4, wherein the first MOF material and the second material are intermixed in the chamber.

8. The device of claim 4, wherein the second material comprises a second MOF material configured to adsorb oxygenated fuel vapor constituents including ethanol.

9. The device of claim 4, further comprising a third material disposed in the chamber, wherein the first MOF material has a pore width that is less than 5 nm, and wherein the second material comprises a second MOF material having a pore width that within a range between 10 nm and 40 nm, wherein the third material comprises an adsorbent material configured to adsorb oxygenated fuel vapor constituents including ethanol, and wherein the first MOF material, the second MOF material, and the third material are intermixed in the chamber.

10. The device of claim 1, wherein the first MOF material comprises a flexible MOF material including a hybrid organic-inorganic material that is assembled by connecting secondary building blocks employing rigid organic ligands;

wherein the flexible MOF material is reversibly controllable to one of a first state or a second state in response to a control stimulus; and wherein the flexible MOF material is configured to adsorb the fuel vapor in the first state and configured to desorb the fuel vapor in the second state.

11. A device for capturing fuel vapor on-vehicle, the device comprising:

a canister device having a first port that is fluidly coupled to a head space portion of a fuel tank, the canister device defining a plurality of chambers that are fluidly coupled in series between the first port and a second port;

wherein the plurality of chambers includes a first chamber that is fluidly coupled in series with a second chamber between the first port and the second port;

wherein the first chamber contains a first Metal Organic Framework (MOF) material that is configured to adsorb fuel vapor; and wherein the second chamber contains a second material that is configured to adsorb fuel vapor.

12. The device of claim 11, wherein the second chamber contains a second MOF material that is configured to adsorb fuel vapor.

13. The device of claim 12, wherein the first MOF material comprises a MOF material having a pore width that is less than 5 nm, and wherein the second MOF material comprises a MOF material having a pore width that is within a range between 10 nm and 40 nm.

14. The device of claim 12, further comprising the canister device defining a third chamber that is fluidly coupled in series with the second chamber between the first chamber and the second port, the third chamber containing a third material that is configured to adsorb fuel vapor.

15. The device of claim 14, wherein the third chamber contains activated carbon.

16. The device of claim 11, wherein the first MOF material comprises a flexible MOF material including a hybrid organic-inorganic material that is assembled by connecting secondary building blocks employing rigid organic ligands.

17. The device of claim 16, wherein the flexible MOF material is reversibly controllable to one of a first state or a second state in response to a control stimulus; and wherein the flexible MOF material is configured to adsorb the fuel vapor in the first state and configured to desorb the fuel vapor in the second state.

18. The device of claim 17, wherein the control stimulus comprises one of a partial pressure, a temperature threshold, a light intensity threshold, an electrical signal, or an electromagnetic signal.

19. The device of claim 18, wherein the flexible MOF material being configured to adsorb fuel vapor in the first state and desorb the fuel vapor in the second state comprises the flexible MOF material being configured to transform to tightly arranged, small pores that are capable of adsorbing the fuel vapor in the first state, and the flexible MOF material being configured to transform to loosely arranged, large pores capable of desorbing the fuel vapor in the second state.

20. The device of claim 16, wherein the flexible MOF material comprises one of MIL-53 Al, MIL-88 series, ZIF-8, or Co(bdp).

* * * * *